(12) United States Patent
Ridenour et al.

(10) Patent No.: US 12,280,683 B2
(45) Date of Patent: Apr. 22, 2025

(54) CHARGE CORD INCLUDING FEATURES FOR DISPLAYING INFORMATION

(71) Applicant: GM Global Technology Operations LLC, Detroit, MI (US)

(72) Inventors: Sabrina Elaine Ridenour, Novi, MI (US); Michael Anthony Manning, Clawson, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 10 days.

(21) Appl. No.: 18/457,525

(22) Filed: Aug. 29, 2023

(65) Prior Publication Data

US 2025/0074223 A1    Mar. 6, 2025

(51) Int. Cl.
*B60L 53/18*    (2019.01)
*H02J 7/00*    (2006.01)

(52) U.S. Cl.
CPC ............ *B60L 53/18* (2019.02); *H02J 7/0042* (2013.01); *H02J 7/0048* (2020.01); *B60L 2250/22* (2013.01)

(58) Field of Classification Search
CPC .... B60L 53/18; B60L 2250/22; H02J 7/0048; H02J 7/0042
USPC ........................................................ 307/10.1
See application file for complete search history.

(56) References Cited

U.S. PATENT DOCUMENTS

| | | | |
|---|---|---|---|
| 2022/0024341 A1* | 1/2022 | Richter | .................. G08B 21/18 |
| 2023/0123176 A1* | 4/2023 | Badger, II | ............. B60L 53/305 |
| | | | 320/109 |

* cited by examiner

*Primary Examiner* — Michael R. Fin
(74) *Attorney, Agent, or Firm* — CANTOR COLBURN LLP

(57) ABSTRACT

An energy transfer system includes a charge cord configured to electrically connect a battery system to an energy source or an energy storage system, the battery system configured to power an electric motor of a vehicle. The energy transfer system also includes a display system including at least one light source attached to the charge cord, and a controller configured to control the display system to generate a visual indicator on the charge cord, the visual indicator indicative of a condition related to an energy transfer operation.

20 Claims, 8 Drawing Sheets

CHARGE CORD INCLUDING FEATURES FOR DISPLAYING INFORMATION

INTRODUCTION

The subject disclosure relates to energy or power transfer, and more particularly to systems and methods for presenting information via a charge cord or charging cable.

Vehicles, including gasoline and diesel powered vehicles, as well as electric and hybrid electric vehicles, feature battery storage for purposes such as powering electric motors, electronics and other vehicle subsystems. Battery assemblies may be charged using dedicated charging stations and other power sources such as residences and buildings connected to a power grid. In addition, some vehicles may have the capability to transfer power to external locations, such as by supplying power to battery assemblies of other vehicles and/or to a grid.

SUMMARY

In one exemplary embodiment, an energy transfer system includes a charge cord configured to electrically connect a battery system to an energy source or an energy storage system, the battery system configured to power an electric motor of a vehicle. The energy transfer system also includes a display system including at least one light source attached to the charge cord, and a controller configured to control the display system to generate a visual indicator on the charge cord, the visual indicator indicative of a condition related to an energy transfer operation.

In addition to one or more of the features described herein, the at least one light source includes a plurality of light sources arrayed along a length of the charge cord.

In addition to one or more of the features described herein, the visual indicator is configured to alert a person as to a location of the charge cord.

In addition to one or more of the features described herein, the controller is configured to generate the visual indicator based on detecting that the person is in a vicinity of the charge cord.

In addition to one or more of the features described herein, the controller is configured to control the display system to generate a pattern of light indicative of the condition, the condition including at least one of a charging condition, a discharging condition, and an environmental condition.

In addition to one or more of the features described herein, the pattern of light is selected based on a charging level.

In addition to one or more of the features described herein, the pattern of light is a moving pattern indicative of a direction of energy flow, the pattern of light moving in a first direction along the charge cord away from the battery system based on the condition being the discharging condition, the pattern of light moving in a second direction along the charge cord toward the battery system based on the condition being the charging condition.

In addition to one or more of the features described herein, the pattern of light is configured to facilitate visual detection of the charge cord when the environmental condition causes the charge cord to be obscured from view.

In addition to one or more of the features described herein, the controller is configured to detect whether at least one of the vehicle and a person is in a vicinity of the energy source or the energy storage system, and the visual indicator is configured to remind the person to plug in the charge cord based on the charge cord being disconnected.

In another exemplary embodiment, a method includes monitoring an energy transfer system, the energy transfer system configured to perform at least one of transferring charge to a battery system from an energy source, and transferring charge from the battery system to an energy storage system, the energy transfer system including a charge cord configured to electrically connect the battery system to the energy source or to the energy storage system, the battery system configured to power an electric motor of a vehicle. The method also includes detecting a condition related to an energy transfer operation, and based on the detecting, controlling at least one light source attached to the charge cord to generate a visual indicator on the charge cord, the visual indicator indicative of the condition.

In addition to one or more of the features described herein, the at least one light source includes a plurality of light sources arrayed along a length of the charge cord.

In addition to one or more of the features described herein, the condition includes a person in a vicinity of the charge cord, and the visual indicator is configured to alert the person as to a location of the charge cord.

In addition to one or more of the features described herein, the visual indicator includes a pattern of light indicative of the condition, and the condition includes at least one of a charging condition, a discharging condition, and an environmental condition.

In addition to one or more of the features described herein, the pattern of light is a moving pattern indicative of a direction of energy flow, the pattern of light moving in a first direction along the charge cord away from the battery system based on the condition being the discharging condition, the pattern of light moving in a second direction along the charge cord toward the battery system based on the condition being the charging condition.

In addition to one or more of the features described herein, the condition includes at least one of a person and the vehicle being in a vicinity of the energy source or the energy storage system, and the visual indicator is configured to remind the person to plug in the charge cord based on the charge cord being disconnected.

In yet another exemplary embodiment, a computer program product includes a computer-readable memory that has computer-executable instructions stored thereupon, the computer-executable instructions when executed by a processor causing the processor to perform operations. The operations include monitoring an energy transfer system, the energy transfer system configured to perform at least one of: transferring charge to a battery system from an energy source, and transferring charge from the battery system to an energy storage system, the energy transfer system including a charge cord configured to electrically connect the battery system to the energy source or to the energy storage system, the battery system configured to power an electric motor of a vehicle. The operations also include detecting a condition related to an energy transfer operation, and based on the detecting, controlling at least one light source attached to the charge cord to generate a visual indicator on the charge cord, the visual indicator indicative of the condition.

In addition to one or more of the features described herein, the at least one light source includes a plurality of light sources arrayed along a length of the charge cord.

In addition to one or more of the features described herein, the condition includes a person in a vicinity of the charge cord, and the visual indicator is configured to alert the person as to a location of the charge cord.

In addition to one or more of the features described herein, the visual indicator includes a pattern of light indicative of the condition, and the condition includes at least one of a charging condition, a discharging condition, and an environmental condition.

In addition to one or more of the features described herein, the pattern of light is a moving pattern indicative of a direction of energy flow, the pattern of light moving in a first direction along the charge cord away from the battery system based on the condition being the discharging condition, the pattern of light moving in a second direction along the charge cord toward the battery system based on the condition being the charging condition.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
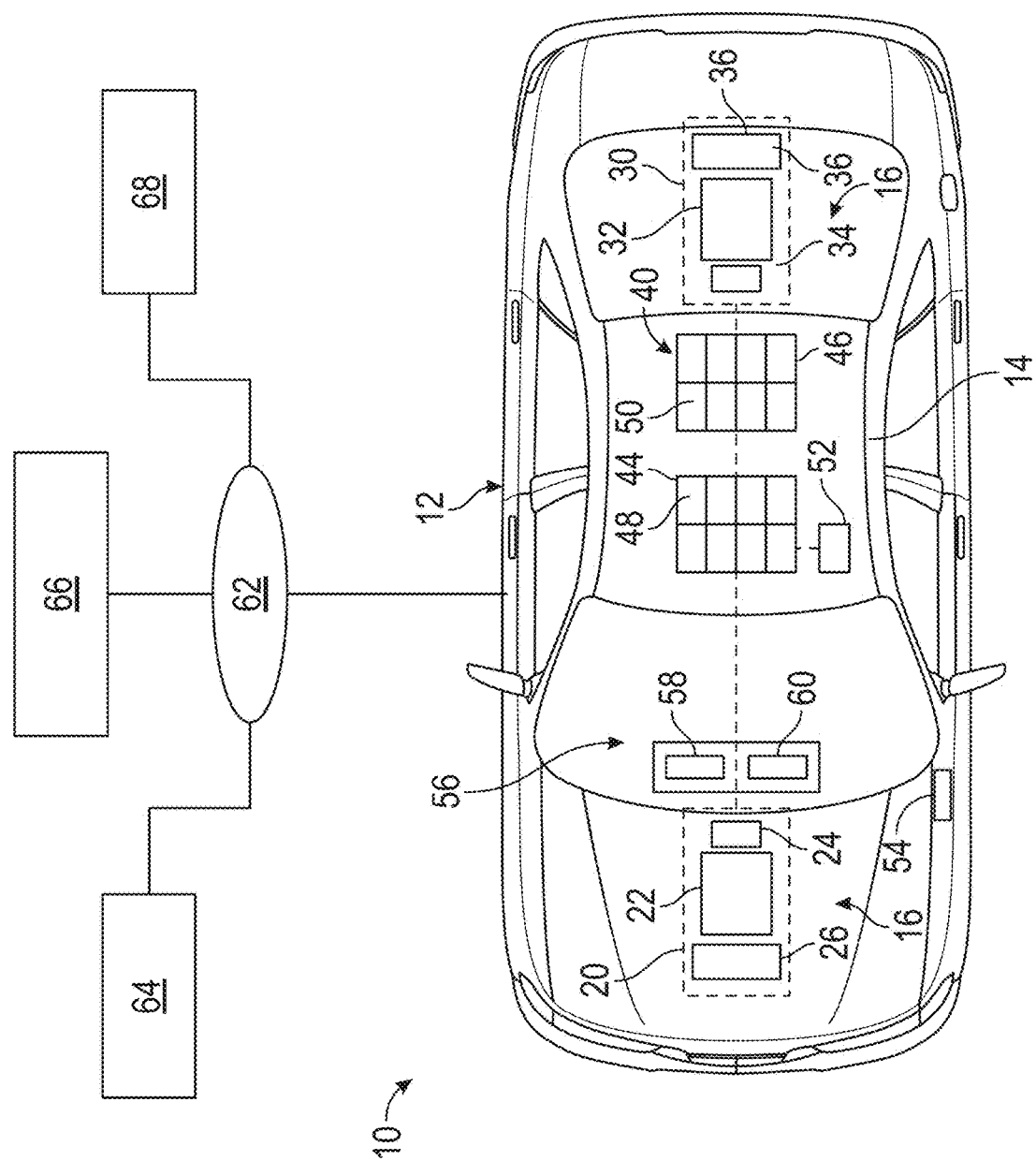
FIG. 1 is a top schematic view of a motor vehicle including a battery system and a charging system, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with one or more exemplary embodiments, methods, devices and systems are provided for presenting or displaying information via a charge cord during, for example, an energy transfer operation. An energy transfer operation may include receiving power to charge a battery system from an external power source, or providing power (discharging) to an external energy storage system.

An embodiment of an energy transfer system includes a charge cord configured to connect a battery system (e.g., an electric vehicle (EV) or hybrid vehicle battery pack) to an external power source (e.g., an electrical grid or charging station) and/or an external energy storage system (e.g., an electrical grid or a recipient vehicle battery system). The charge cord includes a display system having one or more light sources attached to the charge cord, which are configurable to display various types of information. In an embodiment, the one or more light sources include an array of light sources (e.g., a light emitting diode (LED) array or strip). Light sources in the array may be spaced according to a selected distance along the charge cord, or arrayed close enough to one another so that at least a portion of a light pattern appears continuous.

The system includes a processor or controller (or combination of multiple processors or controllers) configured to generate visual indicators in the form of light patterns displayed on the charge cord. A different visual indicator may be configured for each of a plurality of different conditions. For example, light patterns may be configured to indicate that a vehicle battery system is charging or discharging (e.g., by creating a moving light pattern), and/or indicate a charging type (e.g., EV charging Level 1, EV charging Level 2, direct current (DC) fast charging, etc.). In addition, light patterns can be generated based on environmental conditions (e.g., inclement weather, low visibility, darkness, etc.). Various other light patterns may be used for a variety of conditions.

Embodiments described herein present numerous advantages and technical effects. For example, the embodiments enhance charging and discharging operations by providing intuitive and easy to see indicators. Such enhancements include prevention of tripping hazards and improved notifications to users as to various charging and environmental conditions. The embodiments allow for a user or person to quickly react to changes in conditions or situations that can be detrimental (e.g., faults, disconnections, etc.).

The embodiments are not limited to use with any specific vehicle or device or system that utilizes battery assemblies, and may be applicable to various contexts. For example, embodiments may be used with automobiles, trucks, aircraft, construction equipment, farm equipment, automated factory equipment and/or any other device or system that may use high voltage battery packs or other battery assemblies.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, and if the vehicle is a hybrid electric vehicle, a fuel injection subsystem, an exhaust subsystem and others.

The vehicle 10 may be an electrically powered vehicle (EV), a hybrid vehicle or any other vehicle. In an embodiment, the vehicle 10 is an electric vehicle, which includes one or more motors and one or more drive systems. For example, the propulsion system 16 is a multi-drive system that includes a first drive unit 20 and a second drive unit 30. The first drive unit 20 includes a first electric motor 22 and a first inverter 24, as well as other components such as a cooling system 26. The second drive unit 30 includes a second electric motor 32 and a second inverter 34, and other components such as a cooling system 36. The inverters 24 and 34 (e.g., traction power inverter units or TPIMs) each convert direct current (DC) power from a high voltage (HV)

battery system 40 to poly-phase (e.g., two-phase, three-phase, six-phase, etc.) alternating current (AC) power to drive the motors 22 and 32.

In the propulsion system 16, the drive unit 20 and the drive unit 30 are electrically connected to the battery system 40. The battery system 40 may be configured as a rechargeable energy storage system (RESS).

The battery system 40 includes one or more battery assemblies. For example, the battery system 40 includes one or more high voltage battery packs, such as a first battery pack 44 connected to the inverter 24, and a second battery pack 46 connected to the inverter 34. The battery pack 44 includes a plurality of battery modules 48, and the battery pack 46 includes a plurality of battery modules 50. Each module 48, 50 includes a number of individual cells (not shown). In an embodiment, the battery packs 44 and 46 can be independently charged and can be used to independently supply power for propulsion, power supply and/or charging.

The vehicle 10 also includes a charging system, which can be used to charge the battery system 40 and/or to supply power from the battery system 40 to charge another energy storage system (e.g., vehicle-to-vehicle (V2V) and/or vehicle-to-everything (V2X) charging). The charging system includes one or more conversion devices for controlling aspects of charging and/or discharging. For example, at least one conversion device provides for conversion between AC current and DC current and/or voltage control.

In an embodiment, the charging system includes a charging control device 52, such as an onboard charging module (OBCM). The charging control device 52 includes a conversion device in the form of a charger (charge circuit) that includes devices for AC-DC conversion and DC-DC conversion. The charging control device 52 connects the battery system 40 to a charge port 54 for charging vehicle battery systems and/or providing charge to external storage systems.

The vehicle 10 also includes a computer system 56 that includes one or more processing devices 58 and a user interface 60. The computer system 56 may communicate with the charging system controller, for example, to provide commands thereto in response to a user input. The various processing devices, modules and units may communicate with one another via a communication device or system, such as a controller area network (CAN) or transmission control protocol (TCP) bus.

The charging system, the charging control device 52, the computer system 56 and/or other processing components in the vehicle 10 may be configured to communicate with various remote devices and systems such as charge stations and other vehicles. Such communication can be realized, for example, via a network 62 (e.g., cellular network, cloud, etc.) and/or via wireless communication. For example, the vehicle 10 may communicate with one or more charging stations 64, a remote entity 66 (e.g., a workstation, fleet management system, a computer, a server, a service provider, a technician, an engineer, etc.), and/or another vehicle 68.

A "battery system" may include a battery pack, module, cell or combination thereof. Examples of battery systems include the battery system 40, the battery pack 44, the battery pack 46, and any combination thereof. A battery system may be any energy storage device, such as a recipient vehicle battery system (during V2V charging) or any other suitable external energy storage.

Figure 2:
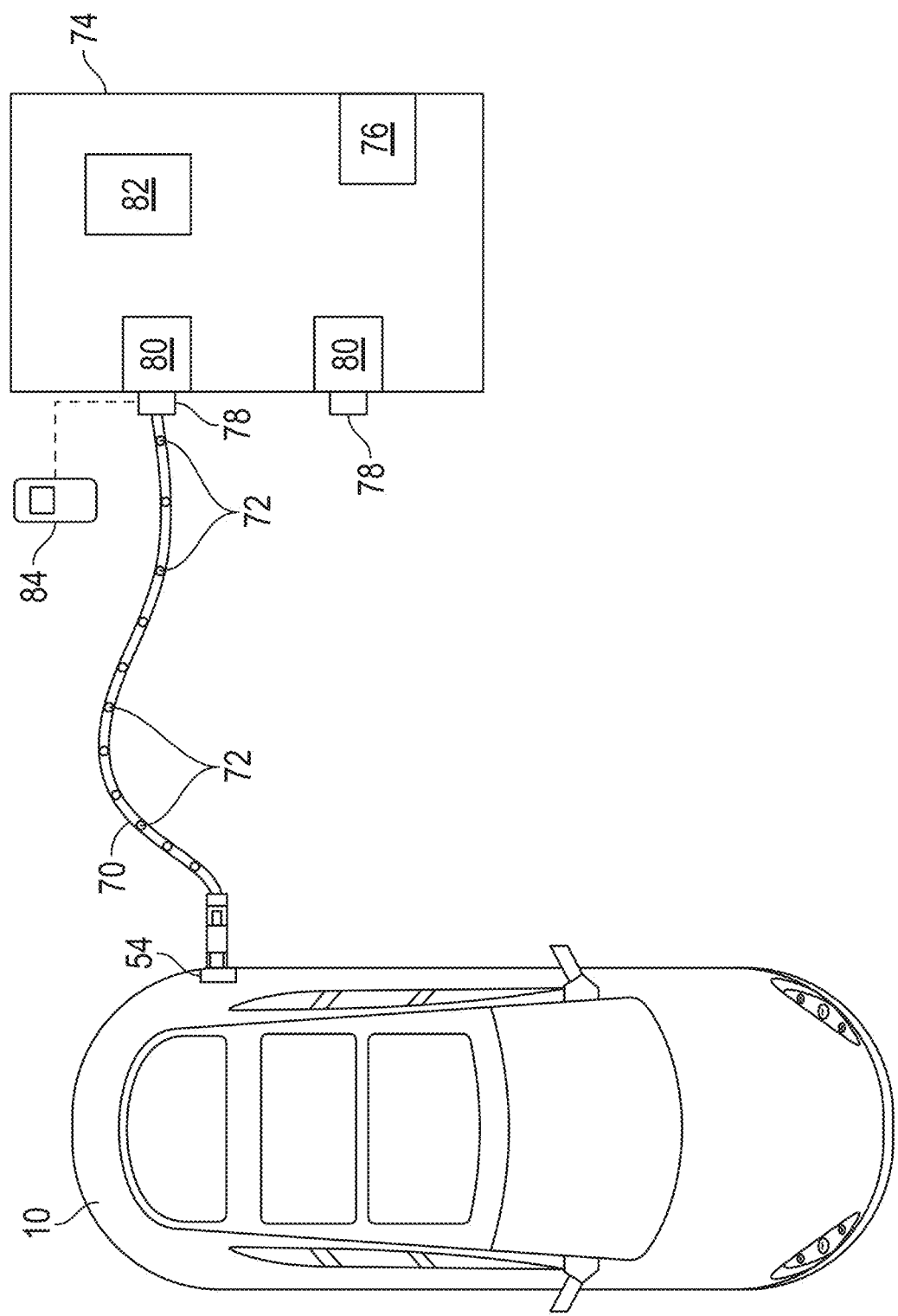
FIG. 2 depicts components of an energy transfer system including a charge cord having a display system for visually imparting information, in accordance with an exemplary embodiment.

FIG. 2 depicts an embodiment of a charging system, including a charge cord having information presentation capabilities. In this embodiment, the vehicle 10 is configured to be connected to an energy source or an energy storage system by a charge cord 70. The charge cord 70 includes one or more light sources arrayed along a selected length of the charge cord. For example, the charge cord 70 includes a plurality of light sources 72.

Each light source 72 may be embedded in the charge cord 70 (e.g., in an outer insulating layer), attached to a sleeve or layer of material surrounding a length of the charge cord 70, adhered to a surface of the charge cord 70, or otherwise disposed at a fixed location relative to the charge cord 70. The light sources 72 may be discrete light sources as shown, or may be a continuous light source (e.g., a light-emitting diode (LED) strip or optical fiber). Generally, a continuous light source is any configuration that produces light that is continuous (or at least appears to a person to be continuous) along some length.

The charge cord 70 may be a charge cord associated with the vehicle 10, an independent charge cord, or a charge cord that is part of an external system. For example, as shown in FIG. 2, the charge cord is part of a charging station 74 (e.g., a DC fast charging or DCFC station).

The charging station 74 may be a fixed charging station connected to a power grid (not shown) via a grid transformer 76, or otherwise including or connected to a power source. The charging station 74 may be a mobile charging station that includes a set of battery packs for providing power to charge the vehicle 10.

The charging station 74 includes one or more charge ports 78, each of which is connected to a DC-DC converter 80. Charging operations may be performed by a charging station controller 82, a vehicle processor (e.g., an OBCM), an external charging station electronic control unit (ECU) 84, or any combination thereof.

In an embodiment, each light source 72 is an LED light source. The light sources 72 may be applied individually, attached via an LED tape or a lighting strip or otherwise embedded or attached to the charge cord 70. Other light source(s) may be used, such as fiber optic light sources including one or more optical fibers (e.g., one or more end-emitting fibers that emit light from an end thereof, one or more edge-emitting optical fibers that emit light along a length thereof, etc.) It is noted that any suitable type of light source, capable of producing visible light, may be used.

The light sources 72 are operated in a manner to produce a visual indicator. A "visual indicator" refers to any emission of visible light by the light sources 72 that imparts information to a person (or to a device or system, such as a camera and/or monitoring system). The visual indicator may be provided simply to alert a person to the location of the charge cord 70 (e.g., to prevent tripping), and/or may provide additional information. Information may be provided via a pattern of illumination or a "light pattern," which is recognizable as indicating a status or providing other information.

For example, all of the light sources 72 (or a selected sub-set) can be activated to simply provide illumination so that the location of the charge cord is easily identified. In other examples, the light sources 72 are operated collectively to generate a stationary or moving light pattern to indicate a charging mode, charging status and/or other condition.

The charging station 74 may include various devices and hardware to facilitate generating indicators and presenting information. Examples include a global positioning system (GPS) device, a wi-fi receiver (e.g., to receive local weather information), an ambient light sensor, a key fob detector, an accelerometer or microphone, a camera or other imaging device, and others.

Figure 3:
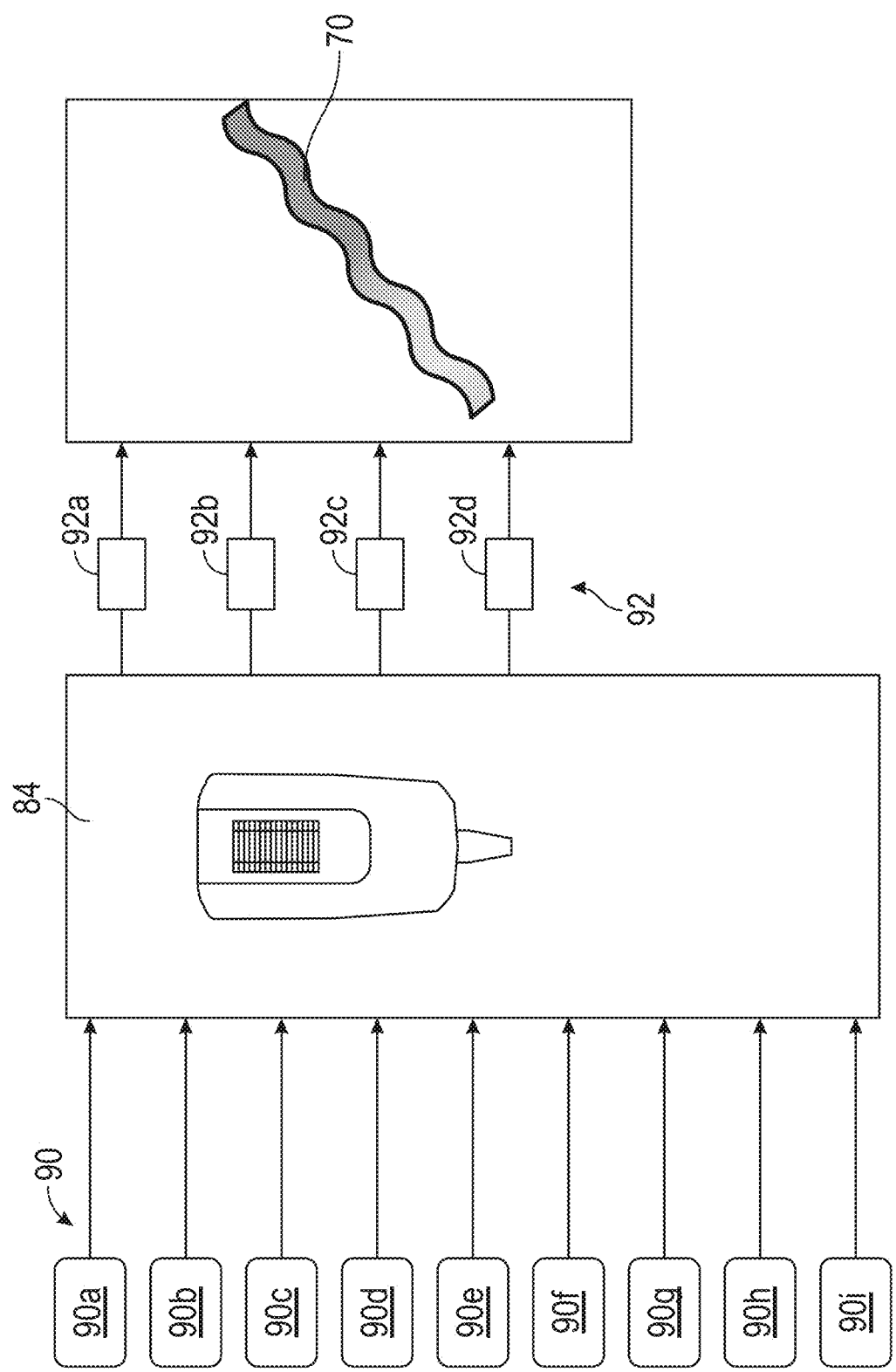
FIG. 3 depicts a flow of inputs and outputs to and from a control device of an energy transfer system, the control device configured to control a display system of a charge cord, in accordance with an exemplary embodiment.

FIG. 3 depicts examples of inputs and outputs that can be used by a processor to generate visual indicators. These examples are described in conjunction with the ECU 84, but are not so limited.

As shown, the ECU 84 receives various inputs 90 that can be used to generate visual indicators. The inputs include, for example, a location 90*a* (e.g., from global positioning system (GPS) information), local weather conditions 90*b*, amount of ambient light 90*c* (e.g., from time/day information and/or from an ambient light sensor), and an indication 90*d* that a vehicle is in proximity to the charging station 74 (e.g., from a key fob detector, a monitoring system, etc.). Other inputs include, for example, an indication 90*e* that a person is in proximity to the charging station 74. Persons may be detected, for example, by footstep detection via an accelerometer or microphone, by a camera or by any other detection mechanism.

Other examples of inputs include a charge/discharge type indication 90*f* (e.g., AC charging, DCFC charging, vehicle-to-vehicle discharging, etc.), vehicle battery state of charge (SOC) when unplugged (indication 90*g*), and vehicle battery SOC when the vehicle 10 is plugged into the charging station 74 (indication 90*h*).

In an embodiment, inputs include indications 90*i* of customer or user preferences. Such preferences can be provided via a mobile application on a user's smartphone, a user interface (e.g., a charging station screen or touchscreen) or any other suitable interface or input device. Customer preference inputs are used to customize the format of a visual indicator for a specific condition or charging status.

In response to the inputs, the ECU 84 provides control signals 92 to the light sources 74, or to a controller configured to operate the light sources. The control signals 92 include, for example, an on/off signal 92*a*, a color and/or pattern command 92*b*, a speed command 92*c* (i.e., a command as to the speed of perceived light flow or perceived light movement) and a direction command 92*d* (i.e., a command as to the direction of perceived light flow).

Figure 4:
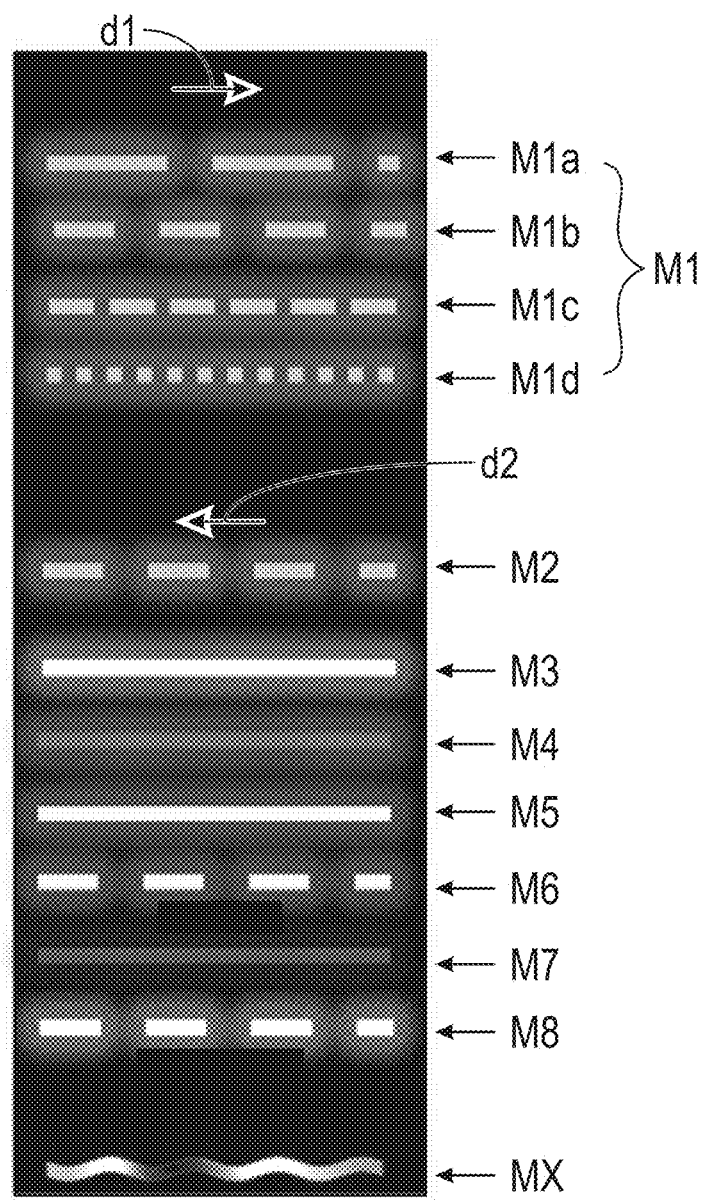
FIG. 4 depicts examples of visual indicators (light patterns) that can be displayed on a charge cord, in accordance with an exemplary embodiment.

FIG. 4 depicts various light patterns that can be used to impart information. It is noted that the patterns are described for illustration purposes, and are not intended to be limiting. As discussed further herein, light patterns may be stationary or moving patterns.

Each pattern shown corresponds to a different mode. A "mode" may refer to a charging mode (e.g., charging, charging type, discharging, etc.), a condition of the vehicle 10, a condition of a charging station (or other power source or energy storage system), an environmental condition, and others.

All or a subset of the light sources 74 can be activated to emit a selected color to indicate a given mode. For example, indicators M1 are used to indicate a vehicle charging mode, and an indicator M2 is used to indicate a discharging mode. The indicators M1 and M2 may be assigned the color yellow (and may be dashed as described further herein). An indicator M3 indicates that charging or discharging is complete, and may be a green color. An indicator M4 indicates an error and may be green, and an indicator M5 may be white and serves to illuminate the charge cord 70 to be visible in dark conditions (a "night light" function). A charge pause indicator M6 may also be white, an inclement weather indicator M7 may be blue, and a "plug in vehicle" reminder M8 may be green.

For example, indicators M1 are provided for different charging modes (i.e., modes in which the vehicle battery system is being charged by the charging station 74 or other power source). As shown, light of a selected color (e.g., yellow) is emitted so that a dashed line pattern (having a series of dashes) is displayed along the charge cord 70.

The indicators M1 may be configured to represent different levels or types of charging. For example, as shown in FIG. 3, level 1 charging, level 2 charging, DC low power (residential) charging and DC fast charging (DCFC) are represented by successively smaller dash lengths. In other words, indicator M1*a* indicates level 1 charging and has long dashes, indicator M1*b* indicates level 2 charging and has dashes that are shorter than the dashes of indicator M1*a*. Indicator M1*c* (low power charging) has dashes that are shorter than the dashes of indicator M1*b*, and indicator M1*d* (DCFC) have even shorter dashes.

In addition, patterns may be stationary or "moving" (i.e., perceived as moving). For example, the light pattern for a charging mode (indicator M1) may be a moving pattern, in which the light sources are operated to provide an illusion that the dashes are moving in a direction d1 along the charge cord 70 from the charging station 74 (or other power source) toward the vehicle 10. In another example, the light pattern for the discharging mode (indicator M2) is presented such that the dashes appear to move in a direction d2 along the charge cord 70 from the vehicle 10 to the charging station 74 (or other energy storage system).

A moving pattern may be configured to move at a selected apparent speed. In an embodiment, the speed of indicators M1 and M2 may be selected based on charging capacity or state of charge (SOC). For example, level 1 charging can be associated with a lowest speed (indicator M1*a*) and DCFC charging can be associated with a highest speed (indicator M1*d*).

As noted above, any of the indicators can be customized based on user preferences. Customized indicators are denoted as an indicator MX.

Figure 5:
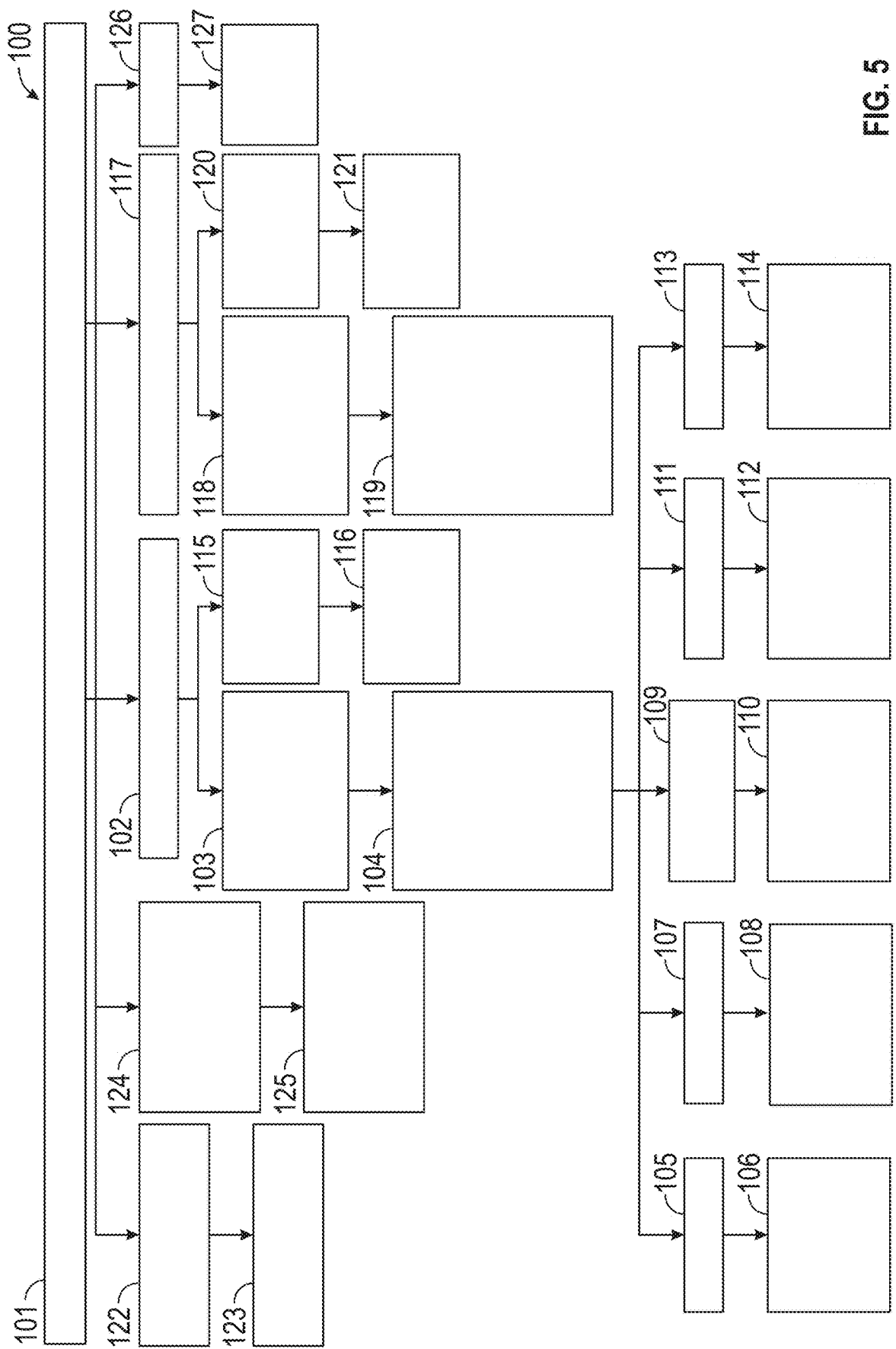
FIG. 5 is a flow diagram depicting aspects of a method of generating visual indicators at a charge cord, in accordance with an exemplary embodiment.

FIG. 5 illustrates embodiments of a method 100 of generating visual indicators at a charge cord. The method 100 is provided for conditions in which a vehicle battery system is connected to a power source or energy storage system in a well-lit environment. The method 100 is described as being performed by the ECU 84, the vehicle 10 and the charging station 74 for illustration purposes, but is not so limited.

The method 100 includes a number of steps or stages represented by blocks 101-127. The method 100 is not limited to the number or order of steps therein, as some steps represented by blocks 101-127 may be performed in a different order than that described below, or fewer than all of the steps may be performed.

Aspects of the methods described herein may be performed by a processor or combination of processors. For example, the method 100 is performed by a charging station controller, a vehicle controller a remote controller (e.g., a controller connected by a network to a charging station or vehicle) or a combination thereof. It is noted the method 100 is not so limited and may be performed by any suitable processing device or system, or combination of processing devices.

At block 101, a processing device such as the ECU 84 detects that the vehicle 10 is connected to the charging station 74 by the charge cord 70. The processing device may also determine whether lighting conditions are sufficient (e.g., by detecting ambient light levels).

If the vehicle 10 is connected and lighting conditions are sufficient, the processing device determines a condition of the vehicle 10, the charging station 74 and/or the environment around the vehicle 10 and the charging station 74.

Based on the determined condition, the processing device controls the light sources 72 to generate a specific light pattern.

If the processing device determines that the vehicle 10 is charging (block 102), the processing device determines whether there is a person in the vicinity of the charge cord 70 at block 103. This determination may be made based on detected footsteps via a microphone or accelerometer, camera monitoring or otherwise.

At block 104, if the processing device detects that a person is in the vicinity (e.g., via detection of footsteps, camera monitoring, key fob detection, etc.), the light sources 72 are operated to provide an indicator (e.g., a M1 indicator) of a charging condition. For example, the light sources 72 pulse yellow to produce dashes that appear to move from the charging station 74 toward the vehicle 10.

The light sources 72 may be controlled to produce a dash length that corresponds to the type of charging. In addition, the perceived speed may be controlled to indicate the rate of charging.

For example, if the charging is level 1 (block 105), the indicator M1$a$ is generated at block 106, which has a longest dash length and a slowest rate of movement. If the charging is level 2 (block 107), the indicator M1$b$ is generated at block 108, which has a longest dash length and a second slowest rate of movement.

If the charging is DC low power (block 109), the indicator M1$c$ is generated at block 110, which has a dash length that is shorter than the M1$b$ dash length, and a rate of movement that is greater than the second slowest rate. If the charging is DCFC (block 111), the indicator M1$d$ is generated at block 112, which has the shortest dash length and the fastest rate of movement.

If charging is paused (block 113), a visual indicator such as a solid white light pattern is displayed on the charge cord 70 at block 114. Once vehicle charging is complete at block 115 (e.g., it is detected that the vehicle battery system 40 has reached a target SOC), the visual indicator is changed to a solid green color (e.g., indicator M3) at block 116.

If the processing device determines that the vehicle 10 is discharging (block 117), the processing device determines whether there is a person in the vicinity of the charge cord 70 at block 118. At block 119, if the processing device detects that a person is in the vicinity, the light sources 72 are operated to provide an indicator (e.g., indicator M2). The indicator may be configured to appear to move toward the vehicle 10. For example, the light sources 72 pulse yellow to produce dashes that appear to move from the vehicle 10 toward the charging station 74.

Upon vehicle discharging completing at block 120 (e.g., it is detected that the vehicle battery system 40 has reached a target discharge SOC), the visual indicator is changed to a solid green color (e.g., indicator M3) at block 121.

The method 100 may include detection of other conditions and generation of associated visual indicators. For example, if a vehicle or station error is detected (block 122), a solid red indicator such as the indicator M4 is generated at block 123. If inclement weather conditions are detected (e.g., rain, snow, fog, etc.) at block 124, a visual indicator is generated at block 125, which is designed to be visible in such conditions. For example, a solid blue color (or other color that is more visible for a given condition) is displayed along the charge cord 70. Lastly, upon disconnection of the vehicle (block 126), and assuming that other relevant conditions do not exist, the light sources 72 are turned off at block 127.

Figure 6:
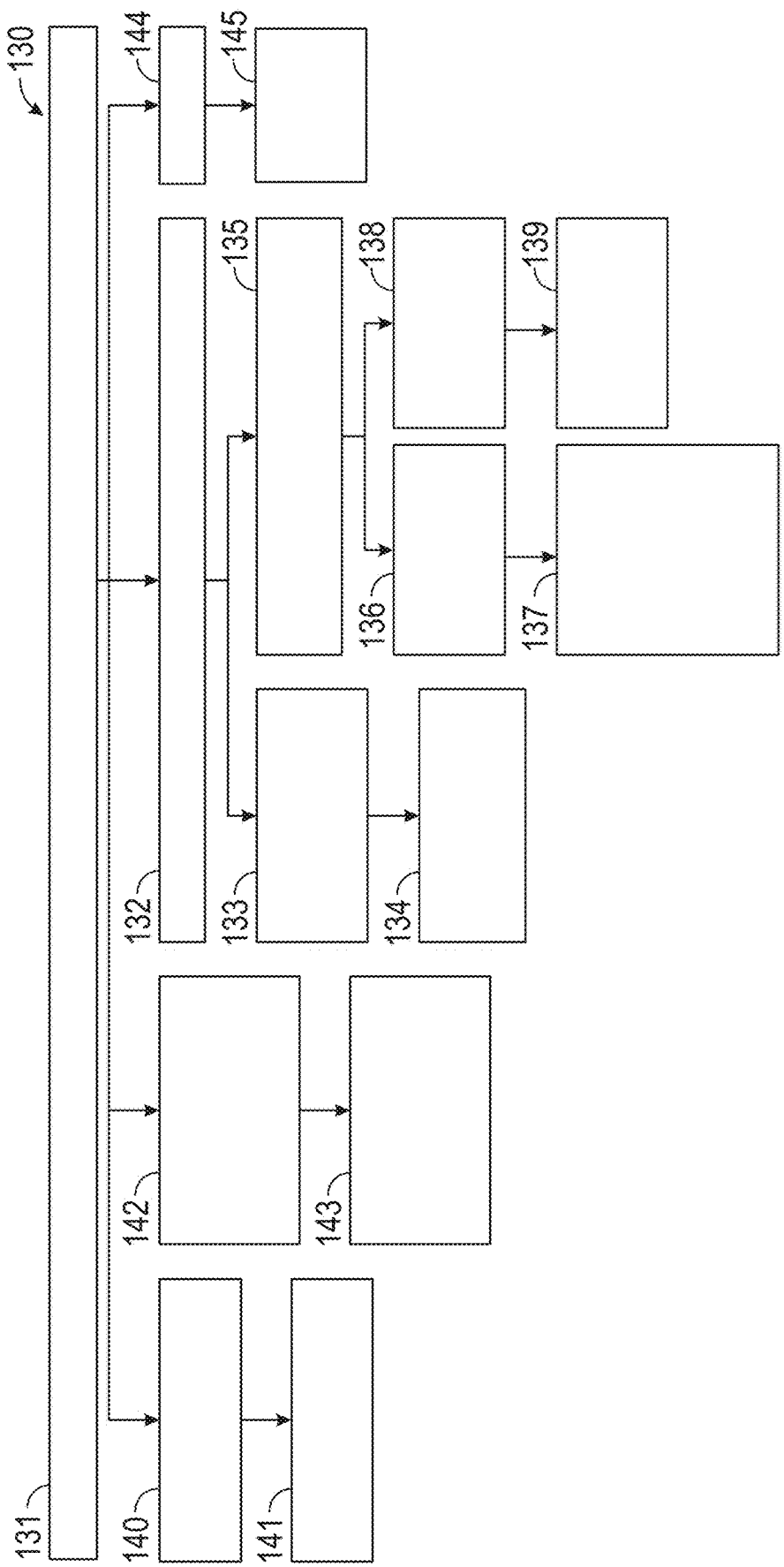
FIG. 6 is a flow diagram depicting aspects of a method of generating visual indicators at a charge cord, in accordance with an exemplary embodiment.

FIG. 6 illustrates embodiments of a method 130 of generating visual indicators at a charge cord, which is provided for situations in which a vehicle and/or person is in the vicinity of the charge cord, but the vehicle is disconnected from an energy source or energy storage system. The method 130 is described as being performed by the ECU 84, the vehicle 10 and the charging station 74 for illustration purposes, but is not so limited.

The method 130 includes a number of steps or stages represented by blocks 131-145. The method 130 is not limited to the number or order of steps therein, as some steps represented by blocks 131-145 may be performed in a different order than that described below, or fewer than all of the steps may be performed.

At block 131, the vehicle 10 is at or near the charging station 74, but is not yet connected to the charging station 74 via the charge cord 70. At block 132, the processing device monitors the charging station 74 and/or environment around the charging station 74. For example, a microphone or accelerometer is monitored to detect nearby footsteps.

At block 133, if footsteps are detected, the processing device monitors ambient light levels and determines whether the environment is too dark (i.e., below a selected light level). Ambient light conditions can be monitored via a light sensor, camera, weather and/or time of day and year information, and others. At block 134, if the environment is too dark, the processing device causes the light sources 72 to generate a solid white light pattern.

At block 135, the processing device detects that the vehicle 10 is in a vicinity of the charging station (e.g., via key fob detection). The processing device communicates with the vehicle 10 (e.g., via wireless communication) and determines the vehicle SOC (or receives an indication from the vehicle that charging is needed). If the SOC is low or it is otherwise determined that charging is needed (block 136), an indicator such as a flashing green solid color is generated (block 137). This indicator may serve as a reminder to a person (driver or user) to plug in the vehicle 10. If charging is not needed (block 138), a solid white color is generated (or maintained) at block 139.

If a vehicle or station error is detected (block 140), a solid red indicator such as the indicator M4 is generated at block 141. If inclement weather conditions are detected (e.g., rain, snow, fog, etc.) at block 142, a visual indicator designed to be seen under such conditions (e.g., solid blue light pattern) is generated at block 143. Lastly, if the vehicle 10 leaves the area and no vehicle or person is detected nearby (block 144), the light sources 72 are turned off at block 145.

It is noted that different condition detections (and associated generation of visual indicator) can be prioritized. For example, in the method 100, detection of a vehicle or station error (block 122) has the highest priority, detection of inclement weather conditions (block 124) has the next highest priority. Vehicle charging (block 102) and discharging (block 117) have a priority below that of block 124, and detection at block 126 has the lowest priority.

In the method 130, for example, detection of a vehicle or station error (block 140) has the highest priority, detection of inclement weather conditions (block 142) has the next highest priority. Detection of a vehicle and/or person (block 132) has a priority below that of block 142, and detection at block 144 has the lowest priority.

As noted herein, the specific format of any given visual indicator may be varied as desired. Thus, any suitable light pattern can be selected for a given condition. In an embodiment, the charging system is configurable so that a user (person or driver) can interact with the vehicle 10 and/or the charging station 74 to customize a visual indicator.

Figure 7:
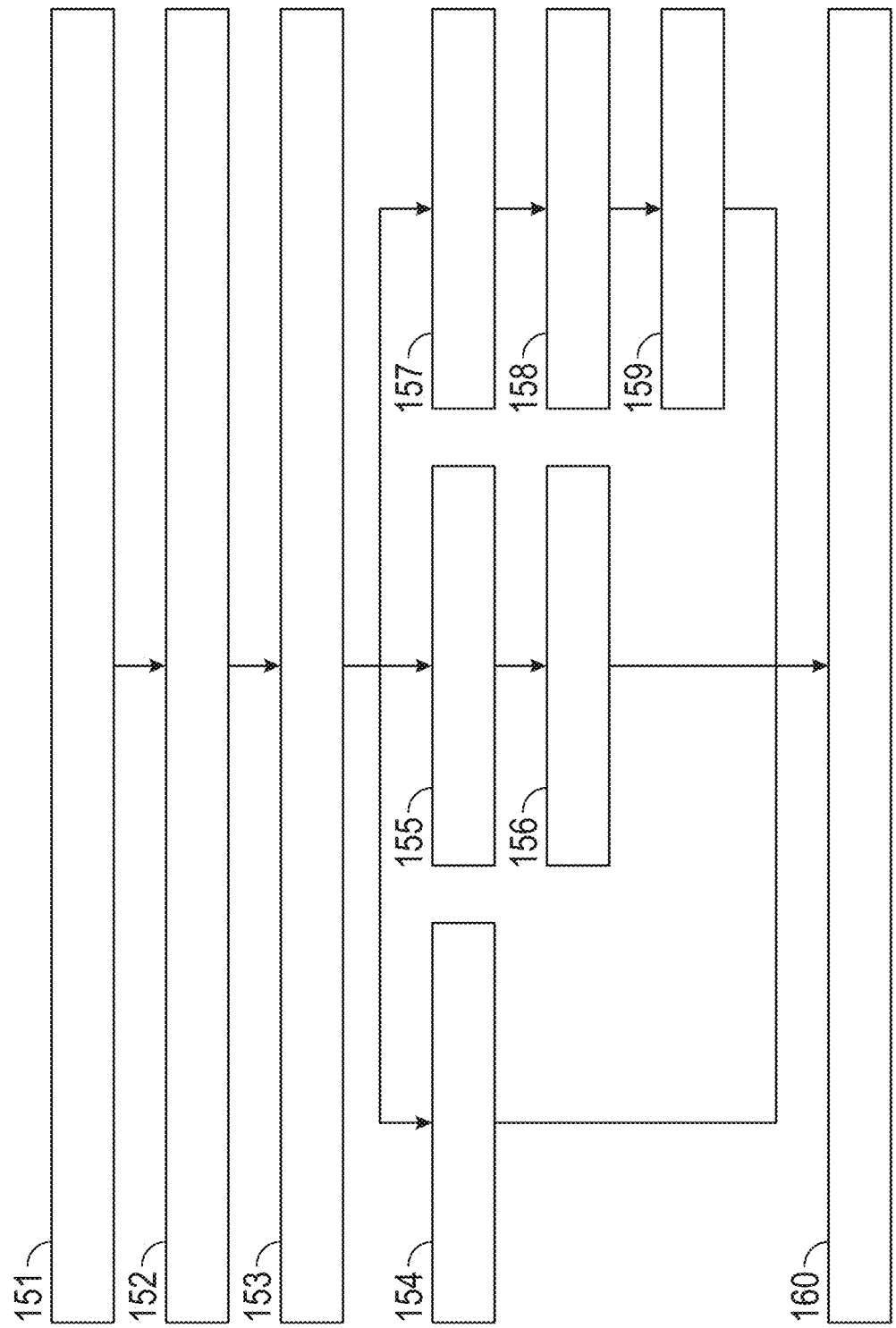
FIG. 7 is a flow diagram depicting aspects of a method of configuring visual indicators that can be displayed on a charge cord, in accordance with an exemplary embodiment.

FIG. 7 illustrates embodiments of a method 150 of customizing or configuring visual indicators. The method may be performed by a customer to save a set of visual indicators specific to a customer's preferences. The method 150 may also be performed by a technician or operator to set up standard visual indicators. The method 150 may be performed using any suitable processing device and user interface.

The method 150 includes a number of steps or stages represented by blocks 151-160. The method 150 is not limited to the number or order of steps therein, as some steps represented by blocks 151-160 may be performed in a different order than that described below, or fewer than all of the steps may be performed.

At block 151, a user inputs indications as to which condition a visual indicator is being designed for. For example, the user inputs "if" conditions for one or more conditions. At block 152, a color (or combination of colors) is selected, and at block 153, light movement effects are selected if desired, such as movement speed and direction.

The user can select whether the light pattern is solid (block 154), pulsing (block 155) or flowing (appearing to move, block 157). If pulsing light is selected, the frequency at which the light pulses (i.e., turns on and off) can be selected at block 156. If flowing light is selected, the frequency or dash length can be selected (block 158) and the direction of movement can be selected (block 159). At block 160, the user selections and configuration of the visual indicator are stored for use by a processing device to generate the preferred indicator.

Figure 8:
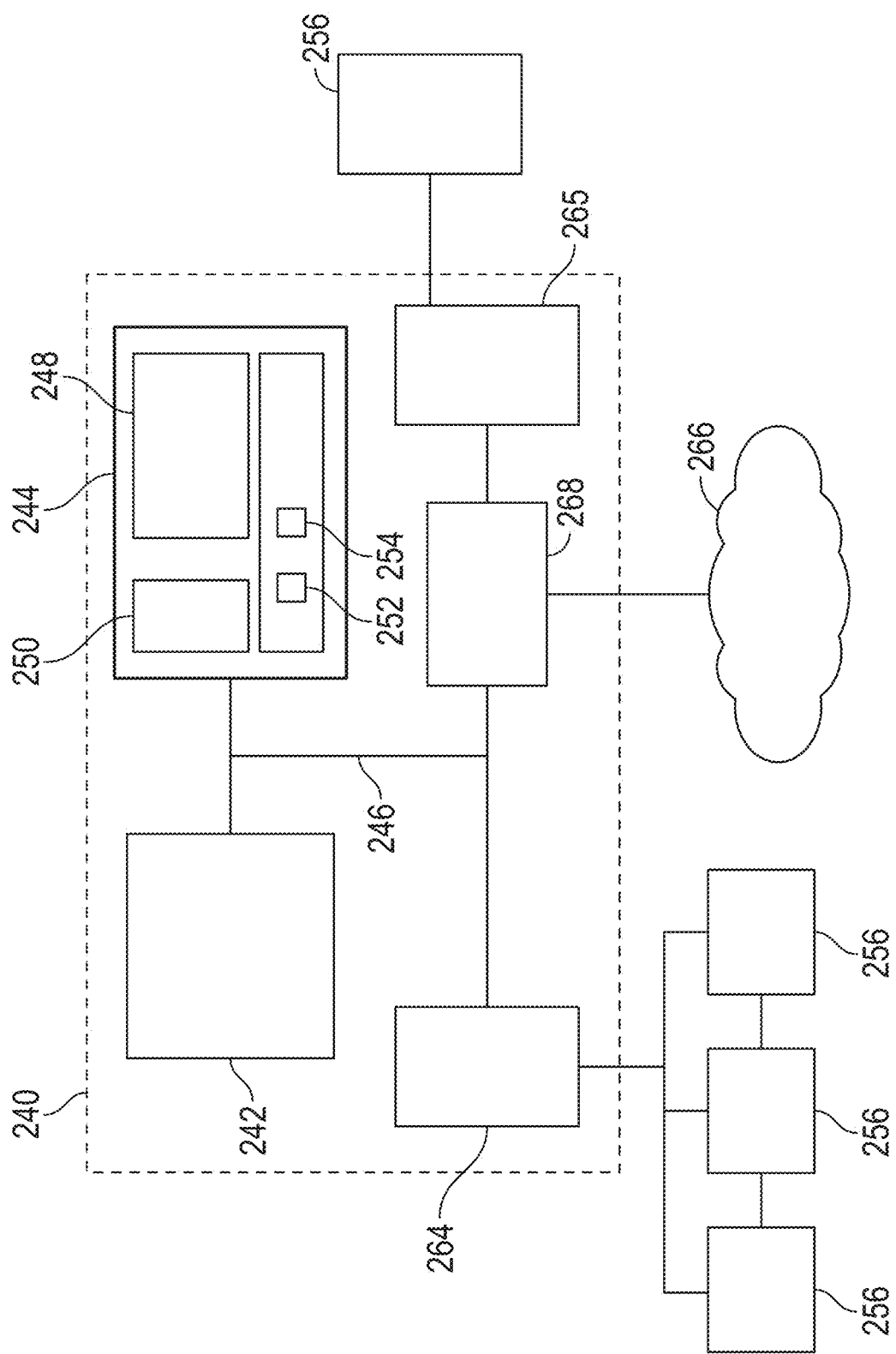
FIG. 8 depicts a computer system in accordance with an exemplary embodiment.

FIG. 8 illustrates aspects of an embodiment of a computer system 240 that can perform various aspects of embodiments described herein. The computer system 240 includes at least one processing device 242, which generally includes one or more processors for performing aspects of image acquisition and analysis methods described herein.

Components of the computer system 240 include the processing device 242 (such as one or more processors or processing units), a memory 244, and a bus 246 that couples various system components including the system memory 244 to the processing device 242. The system memory 244 can be a non-transitory computer-readable medium, and may include a variety of computer system readable media. Such media can be any available media that is accessible by the processing device 242, and includes both volatile and non-volatile media, and removable and non-removable media.

For example, the system memory 244 includes a non-volatile memory 248 such as a hard drive, and may also include a volatile memory 250, such as random access memory (RAM) and/or cache memory. The computer system 240 can further include other removable/non-removable, volatile/non-volatile computer system storage media.

The system memory 244 can include at least one program product having a set (i.e., at least one) of program modules that are configured to carry out functions of the embodiments described herein. For example, the system memory 244 stores various program modules that generally carry out the functions and/or methodologies of embodiments described herein. A module 252 may be included for performing functions related to acquiring signals and data, and a module 254 may be included to perform functions related to control of light sources at a charge cord as discussed herein. The system 240 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 242 can also communicate with one or more external devices 256 as a keyboard, a pointing device, and/or any devices (e.g., network card, modem, etc.) that enable the processing device 242 to communicate with one or more other computing devices. Communication with various devices can occur via Input/Output (I/O) interfaces 264 and 265.

The processing device 242 may also communicate with one or more networks 266 such as a local area network (LAN), a general wide area network (WAN), a bus network and/or a public network (e.g., the Internet) via a network adapter 268. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this invention belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:
1. An energy transfer system comprising:
a charge cord configured to electrically connect a battery system to an energy source or an energy storage system, the battery system configured to power an electric motor of a vehicle;

a display system including at least one light source attached to the charge cord; and
a controller configured to control the display system to generate a visual indicator on the charge cord, the visual indicator indicative of a condition related to an energy transfer operation, the controller configured to perform at least one of:
generating the visual indicator based on detecting an inclement weather condition, the visual indicator including a pattern of light selected to be visible in the inclement weather condition; and
detecting whether a person is in a vicinity of the charge cord, and based on detecting that the person is in the vicinity, determining a light level in an environment around the charge cord, and generating the visual indicator based on the light level being less than a selected light level.

2. The energy transfer system of claim 1, wherein the at least one light source includes a plurality of light sources arrayed along a length of the charge cord.

3. The energy transfer system of claim 1, wherein the visual indicator is configured to provide an alert as to a location of the charge cord.

4. The energy transfer system of claim 1, wherein the visual indicator is indicative of a charging type, and includes a series of dashes, and each dash of the series of dashes has a length selected based on the charging type.

5. The energy transfer system of claim 1, wherein the condition includes at least one of a charging condition, a discharging condition, and an environmental condition.

6. The energy transfer system of claim 1, wherein the pattern of light is selected based on a charging level.

7. The energy transfer system of claim 5, wherein the pattern of light is a moving pattern indicative of a direction of energy flow, the pattern of light moving in a first direction along the charge cord away from the battery system based on the condition being the discharging condition, the pattern of light moving in a second direction along the charge cord toward the battery system based on the condition being the charging condition.

8. The energy transfer system of claim 5, wherein the pattern of light is configured to facilitate visual detection of the charge cord when the environmental condition causes the charge cord to be obscured from view.

9. The energy transfer system of claim 1, wherein the controller is configured to detect whether at least one of the vehicle and the person is in a vicinity of the energy source or the energy storage system, and the visual indicator is configured to remind the person to plug in the charge cord based on the charge cord being disconnected.

10. A method comprising:
monitoring an energy transfer system, the energy transfer system configured to perform at least one of: transferring charge to a battery system from an energy source, and transferring charge from the battery system to an energy storage system, the energy transfer system including a charge cord configured to electrically connect the battery system to the energy source or to the energy storage system, the battery system configured to power an electric motor of a vehicle;
detecting a condition related to an energy transfer operation; and
based on the detecting, controlling at least one light source attached to the charge cord to generate a visual indicator on the charge cord, the visual indicator indicative of the condition, wherein the controlling includes at least one of:
generating the visual indicator based on detecting an inclement weather condition, the visual indicator including a pattern of light selected to be visible in the inclement weather condition; and
detecting whether a person is in a vicinity of the charge cord, and based on detecting that the person is in the vicinity, determining a light level in an environment around the charge cord, and generating the visual indicator based on the light level being less than a selected light level.

11. The method of claim 10, wherein the at least one light source includes a plurality of light sources arrayed along a length of the charge cord.

12. The method of claim 10, wherein the visual indicator is configured to alert the person as to a location of the charge cord.

13. The method of claim 10, wherein the condition includes at least one of a charging condition, a discharging condition, and an environmental condition.

14. The method of claim 13, wherein the pattern of light is a moving pattern indicative of a direction of energy flow, the pattern of light moving in a first direction along the charge cord away from the battery system based on the condition being the discharging condition, the pattern of light moving in a second direction along the charge cord toward the battery system based on the condition being the charging condition.

15. The method of claim 10, wherein the condition includes at least one of the person and the vehicle being in a vicinity of the energy source or the energy storage system, and the visual indictor is configured to remind the person to plug in the charge cord based on the charge cord being disconnected.

16. A computer program product comprising a computer-readable memory that has computer-executable instructions stored thereupon, the computer-executable instructions when executed by a processor cause the processor to perform operations comprising:
monitoring an energy transfer system, the energy transfer system configured to perform at least one of: transferring charge to a battery system from an energy source, and transferring charge from the battery system to an energy storage system, the energy transfer system including a charge cord configured to electrically connect the battery system to the energy source or to the energy storage system, the battery system configured to power an electric motor of a vehicle;
detecting a condition related to an energy transfer operation; and
based on the detecting, controlling at least one light source attached to the charge cord to generate a visual indicator on the charge cord, the visual indicator indicative of the condition, wherein the controlling includes at least one of:
generating the visual indicator based on detecting an inclement weather condition, the visual indicator including a pattern of light selected to be visible in the inclement weather condition; and
detecting whether a person is in a vicinity of the charge cord, and based on detecting that the person is in the vicinity, determining a light level in an environment around the charge cord, and generating the visual indicator based on the light level being less than a selected light level.

17. The computer program product of claim 16, wherein the at least one light source includes a plurality of light sources arrayed along a length of the charge cord.

18. The computer program product of claim 1, wherein the visual indicator is indicative of a charging type, and includes a series of dashes, and each dash of the series of dashes has a length selected based on the charging type.

19. The computer program product of claim 16, wherein the condition includes at least one of a charging condition, a discharging condition, and an environmental condition.

20. The computer program product of claim 19, wherein the pattern of light is a moving pattern indicative of a direction of energy flow, the pattern of light moving in a first direction along the charge cord away from the battery system based on the condition being the discharging condition, the pattern of light moving in a second direction along the charge cord toward the battery system based on the condition being the charging condition.

\* \* \* \* \*